United States Patent [19]

Chambers

[11] Patent Number: 5,131,531
[45] Date of Patent: Jul. 21, 1992

[54] MODULAR CONVEYOR

[75] Inventor: Curtis D. Chambers, Muskegon, Mich.

[73] Assignee: Dynamic Conveyor Corporation, Muskegon, Mich.

[21] Appl. No.: 634,477

[22] Filed: Dec. 27, 1990

[51] Int. Cl.⁵ ............................................. B65G 21/14
[52] U.S. Cl. .................................. 198/860.2; 198/841
[58] Field of Search .................... 198/735.2, 860.2, 841

[56] References Cited

U.S. PATENT DOCUMENTS

| | | |
|---|---|---|
| 1,395,986 | 11/1921 | Meyer . |
| 1,527,486 | 2/1925 | Manierre . |
| 1,845,066 | 2/1932 | Walter ............................... 198/735.2 |
| 2,200,116 | 5/1940 | Maguire et al. . |
| 2,222,316 | 11/1940 | Maguire et al. ................... 198/735.2 |
| 2,373,839 | 4/1945 | Madeira . |
| 2,632,556 | 3/1953 | Alpers et al. . |
| 3,456,776 | 7/1969 | Viene . |
| 3,825,108 | 7/1974 | Stone . |
| 3,835,982 | 9/1974 | Zappia . |
| 4,013,167 | 3/1977 | Bourgeois ......................... 198/860.2 |
| 4,051,948 | 10/1977 | Sackett ............................. 198/735.2 |
| 4,133,424 | 1/1979 | Sabes . |
| 4,172,677 | 10/1979 | Gunti . |
| 4,295,561 | 10/1981 | Yasukawa et al. . |
| 4,339,908 | 8/1983 | Gunti . |

FOREIGN PATENT DOCUMENTS

| | | | |
|---|---|---|---|
| 1254070 | 11/1967 | Fed. Rep. of Germany ... | 198/735.2 |
| 75714 | 4/1986 | Japan .................................. | 198/841 |

OTHER PUBLICATIONS

Thrift Products Catalog (Conveyor Literature) (1989 edition) pp. 5-12.

Primary Examiner—Joseph E. Valenza
Attorney, Agent, or Firm—Varnum, Riddering, Schmidt & Howlett

[57] ABSTRACT

A modular conveyor is defined by a belt-supporting frame (4), leg supports (2) for supporting the frame (4), and a continuous conveyor belt (6) supported and guided by the frame (4) for continuous movement. The modular conveyor is improved by providing the frame (4) with a plurality of modular frame assemblies (16) and connector assemblies (14, 18) for joining the modular frame assemblies (16) end to end to form conveyors of different size and shape wherein the connector assemblies (14, 18) and modular frame assemblies (16) are joined end to end in alternating relationship. The connector assemblies (14, 18) comprise straight connector assemblies (14) for extending the conveyor along a linear path and angular connector assemblies (18) for extending the conveyor along an angular path with respect to a preceding modular frame assembly (16). The angular connector assemblies (18) can be used to extend the conveyor along an upward direction or along a downward direction. Each of the modular frame assemblies (16) comprises at least one frame member (8) with a belt guide channel (124) to guide an edge of the belt (6), at least one cross member (26) attached to the frame member (8) and belt supports (100) on the cross members (26). The modular frame assemblies (16) are preferably made of synthetic plastic resin.

26 Claims, 7 Drawing Sheets

MODULAR CONVEYOR

BACKGROUND OF THE INVENTION

1. Field of the Invention

This invention relates to a modular conveyor which is capable of being adapted to different sizes and shapes by joining modular assemblies of the conveyor end to end.

2. Description of the Related Art

U.S. Pat. No. 3,456,776, issued Jul. 22, 1969 to Viene, discloses a conventional sanitary food conveyor. The conveyor comprises a number of straight frame sections joined together. The framework is mounted upon leg supports which are mounted to wheels.

U.S. Pat. No. 2,632,556, issued Mar. 24, 1953 to Alpers et al., discloses a conveyor having connecting troughs to connect a main trough to hopper and discharge troughs at various angular configurations with respect to each other. An interconnecting link connects the troughs at various angular positions through pivot pins. The troughs are formed of conventional side slats.

A more convenient way of providing a change in the height of a conveyor belt is needed. Also, a conveyor like that disclosed in Alpers et al. can only assume a limited number of sizes and shapes because of its rigid construction. Thus, there is a need for a conveyor which may be adapted to various sizes and shapes. Secondly, a conveyor is needed that can be adapted to convey materials at a different height but without having to adjust the length of the conveyor belt. Furthermore, it would be desirable to injection mold or die cast each of the parts of such a conveyor.

SUMMARY OF THE INVENTION

According to the invention, a conveyor has a belt support frame, leg supports for the belt support frame and a continuous belt supported and guided by the belt support frame for continuous movement. The invention provides an improved belt support frame comprising a plurality of modular assemblies, connectors for joining the modular assemblies end to end to form conveyors of different size and shape wherein each of the modular assemblies comprises at least one frame member with a belt guide channel to guide an edge of the belt, at least one cross member attached to the frame member and belt supports on the cross members. The belt supports have a belt support surface in belt-supporting relationship to the belt. Preferably, the modular assemblies comprise a frame member on each side of the modular assembly. The modular assemblies further comprise a belt guide connected to the frame member and forming the belt guide channel. Desirably, the modular assemblies are made of a synthetic plastic resin. In one embodiment of the invention, spacers are provided between the belt supports to position the supports on the cross members. Spacers comprise rods mounted between the belt guides, sleeves mounted on the rods between the belt supports and between the belt supports and the belt guides.

Preferably, the modular assemblies further comprise connector assemblies and frame assemblies joined end to end in alternating relationship. The connector assemblies comprise straight sections for extending the conveyor along a linear path and angular sections for extending the conveyor along an angular path with respect to the preceding modular section. The modular assemblies are preferably symmetrical at least about a vertical transverse plane. Some of the modular assemblies are symmetrical about a horizontal plane and about a vertical longitudinal plane.

Further according to the invention, a conveyor having a belt-supporting frame, leg supports for supporting the frame and a continuous belt supported and guided by the frame for continuous movement is improved by a belt-supporting frame comprising a plurality of modular frame assemblies, connectors for joining the modular frame assemblies end to end to form conveyors of different size and shape wherein the connectors and frame assemblies are joined end to end in alternating relationship. The connectors comprise straight sections for extending the conveyor along a linear path and angular sections for extending the conveyor along an angular path with respect to a preceding modular frame assembly. The angular sections are symmetrical about a vertical plane so that the angular section can be used to extend the conveyor along an upward direction or along a downward direction. Straight connector sections and the modular frame assemblies are symmetrical about each of the perpendicular planes so that the straight connector sections and the modular frame assemblies can be used in a variety of different orientations.

In a preferred embodiment of the invention, the modular frame assemblies comprise side frame members made from a synthetic plastic resin and forming sidewalls of the modular frame assembly, cross members made from a synthetic plastic resin connected to side frame members and belt supports made from synthetic plastic resin, mounted on the cross members and having a belt support surface for supporting the belt. Preferably, the modular frame assemblies further comprise a belt guide made of a synthetic plastic material and mounted to an inner surface of the side frame members, the belt guide having an inwardly directed channel to guide the belt.

The invention further comprises a conveyor system wherein modular frame parts and modular connector parts are provided for assembling conveyors of different size, shape and orientation simply by connecting together the modular frame members in a variety of possible combinations.

BRIEF DESCRIPTION OF THE DRAWINGS

The invention will now be described with reference to the drawings in which.

DETAILED DESCRIPTION OF THE PREFERRED EMBODIMENT

Figure 1:
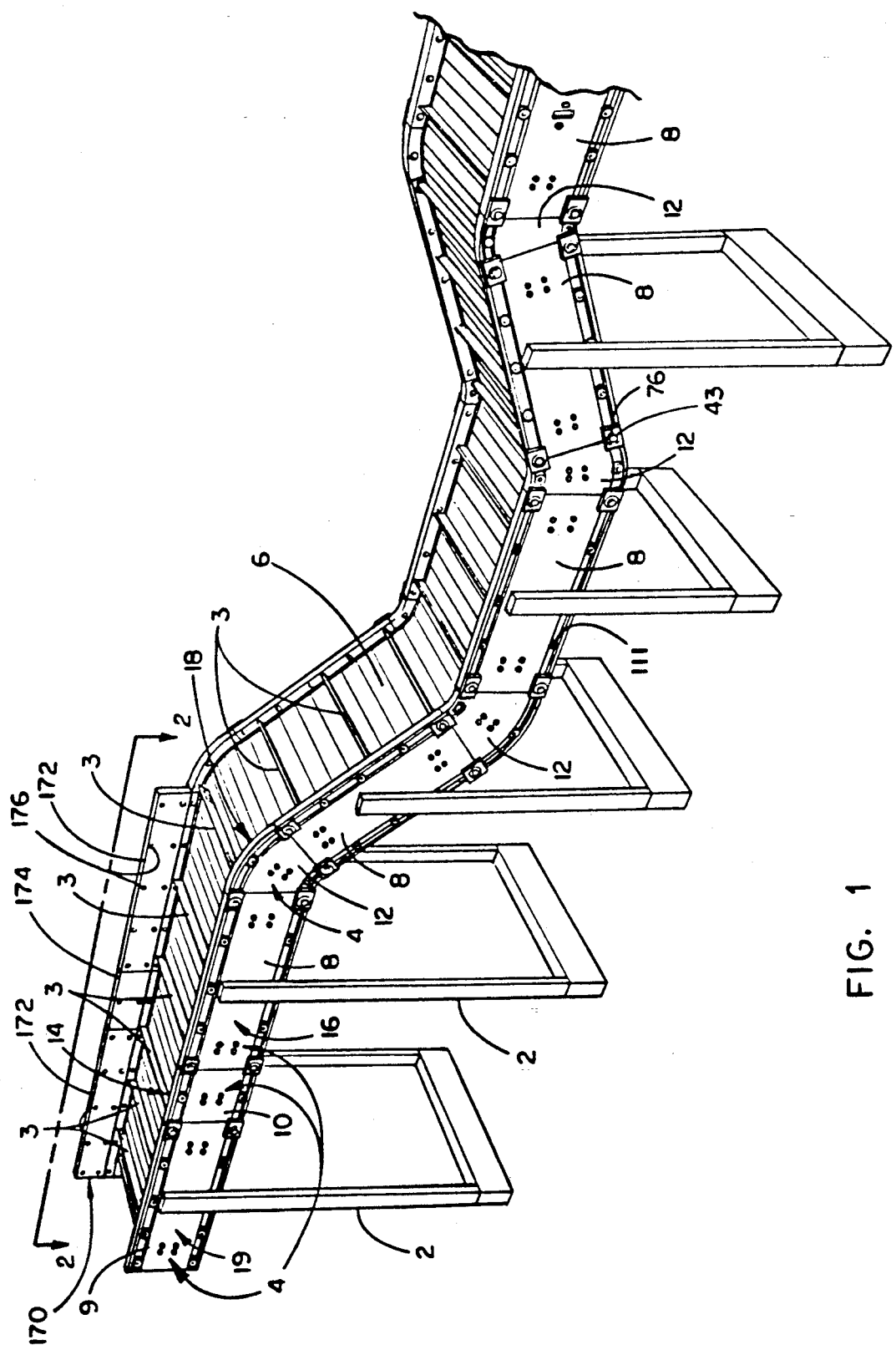
FIG. 1 is a perspective view of a modular conveyor according to the invention and showing part of a retaining fence.

All references made in this description to "longitudinal," "transverse," "horizontal" or "vertical," are with respect to the embodiment in FIG. 1 and for the purpose of facilitating understanding of the invention. Reference to "longitudinal" or "transverse" is made with reference to a conveyor having a length greater than its width. Furthermore, any reference made herein to an "interior" surface refers to a surface relatively closer to the longitudinal axis running down the center of the conveyor and reference made to an "exterior" surface refers to a surface relatively farther away from the center longitudinal axis of the conveyor.

Figure 2:
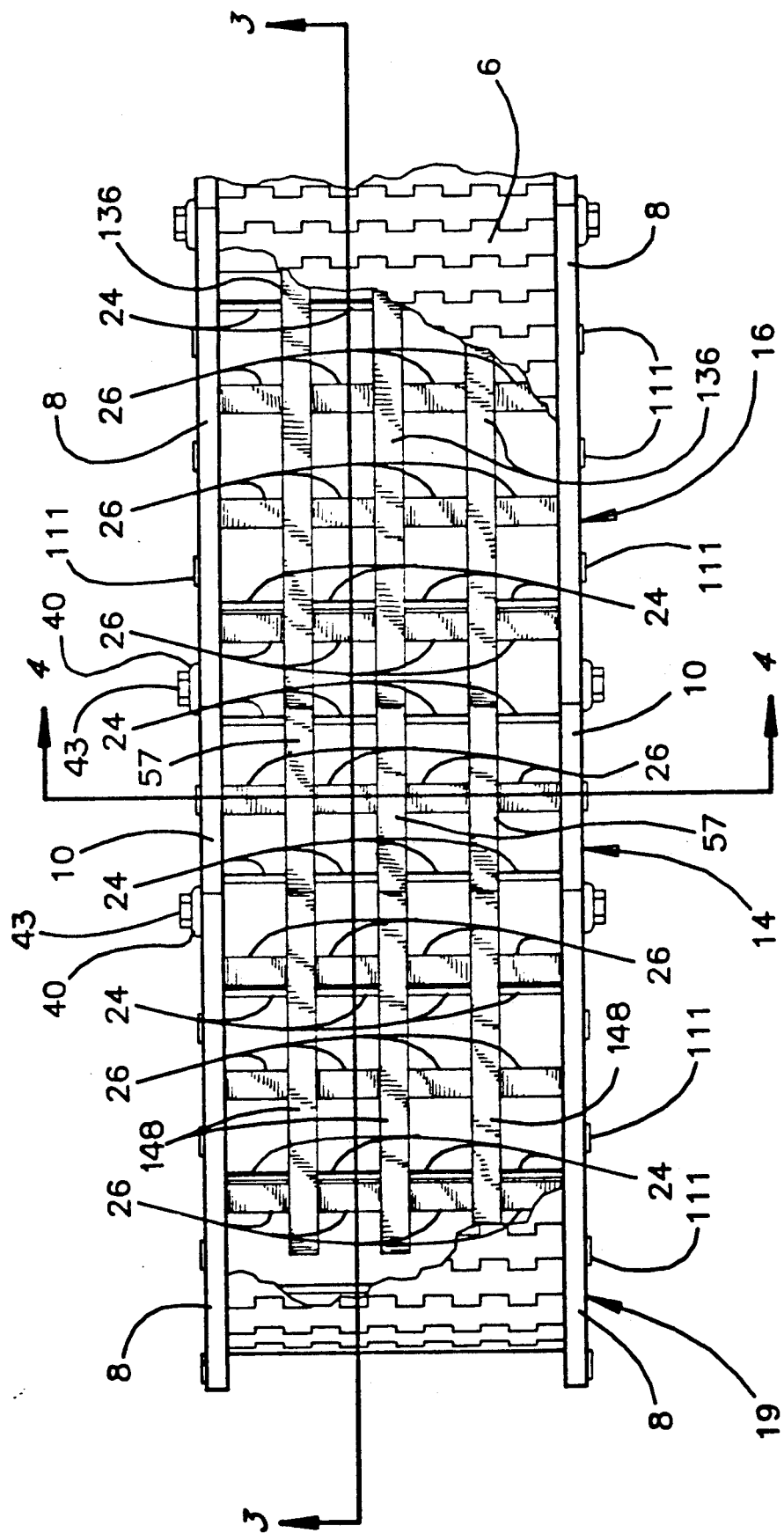
FIG. 2 is a plan view of a portion of the conveyor taken along lines 2—2 of FIG. 1 and partially broken away to show interior construction of the conveyor.

Referring now to FIGS. 1 and 2, a modular conveyor according to the invention is shown. A particular configuration for the conveyor is shown in FIG. 1, but is merely intended to be illustrative of a possible configuration. The conveyor may be arranged in an unlimited number of different configurations in practice. The conveyor comprises a conveyor belt 6, a framing means 4, and support members 2. The particular construction of each support member 2 is not a crucial aspect of the invention, and different means for supporting the conveyor can be used. For instance, the support members 2 can have wheels mounted thereon for easy transport of the conveyor from place to place. A preferred embodiment of the framing means 4 comprises four elements: a frame assembly 16 (FIG. 6), a straight connector assembly 14 (FIG. 5), an angular connector assembly 18 (FIG. 7), and an end section assembly 19 (FIG. 3).

The angular connector assemblies 18 change the direction of the conveyor belt 6 with respect to the horizontal. For instance, the angular connector assemblies 18 can be used to provide a conveyor having a horizontal conveying section at one height and a different horizontal conveying section at a different height. Each angular connector assembly 18 can be oriented to provide a downwardly directed framing means or an upwardly directed framing means. Each angular connector assembly 18 can be rotated approximately 180° before connecting it to the remainder of the framing means to direct the conveyor in an upward direction or a downward direction. The angular connector assemblies 18 can be constructed to form various angles. For example, by providing an angular connector assembly with an arc of 30° and an angular connector assembly with an arc of 45°, great flexibility in constructing a conveyor system can be achieved.

FIG. 2 illustrates the conveyor belt 6 supported by one frame assembly 16, one end section assembly 19, and one straight connector assembly 14. The frame assembly 16 is the principal building block of the modular conveyor. Each frame assembly 16 is connected to another frame assembly 16 by a connector means comprising either the straight connector assembly 14 or the angular connector assembly 18. The straight connector assembly 14 is used to connect frame assemblies 16 together when no change in the elevation of the conveyor is desired. The angular connector assembly 18 is used to connect frame assemblies together when a change is desired in the elevation of the conveyor.

Figure 3:
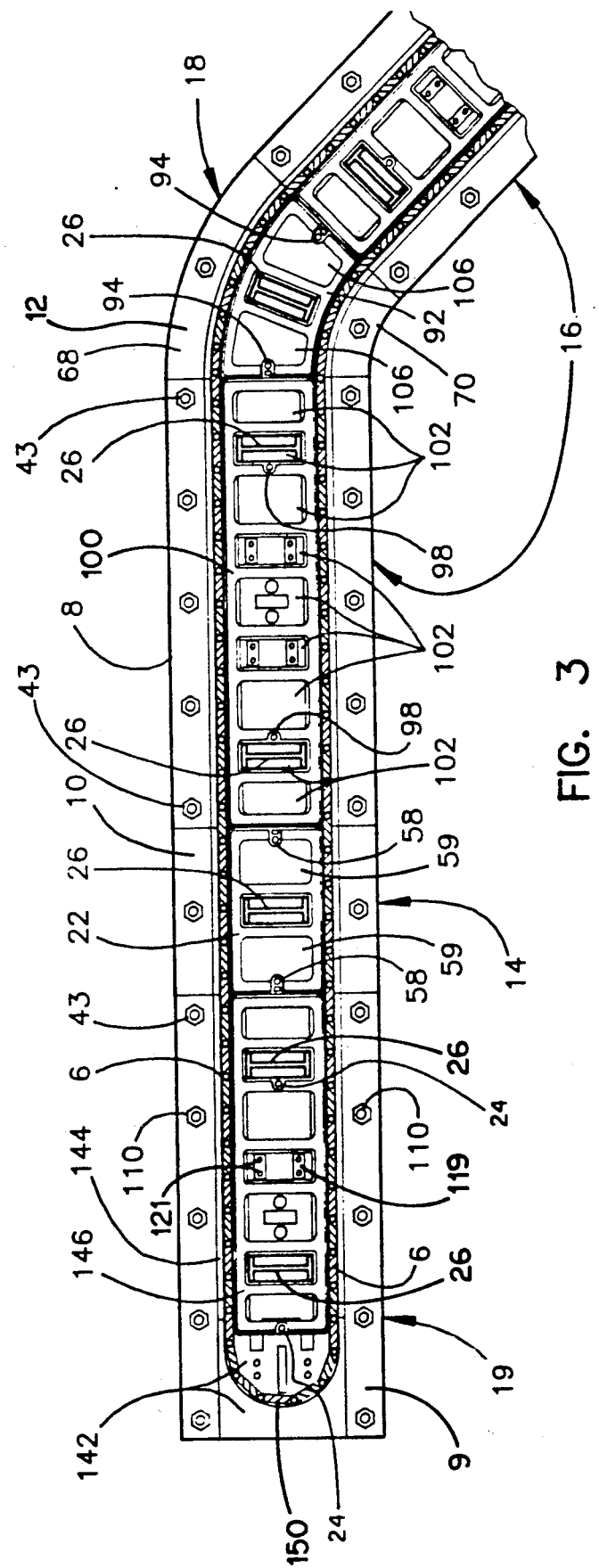
FIG. 3 is a sectional view of the conveyor taken along lines 3—3 of FIG. 2 and shown in elevation.

As shown in FIG. 3, the angular connector assembly 18 can be used to provide an inclined angle to the conveyor. The end section assembly 19 is used to form the end of the conveyor. As a certain portion of the conveyor belt 6 moves longitudinally, the end section assembly 19 provides a means for guiding the belt from an upper conveying position to a lower return position. In other words, the conveyor belt 6 forms a large continuous loop of flexible material which is returned at each end of the conveyor. The construction of the end section assembly 19 will be described in detail below.

Figure 4:
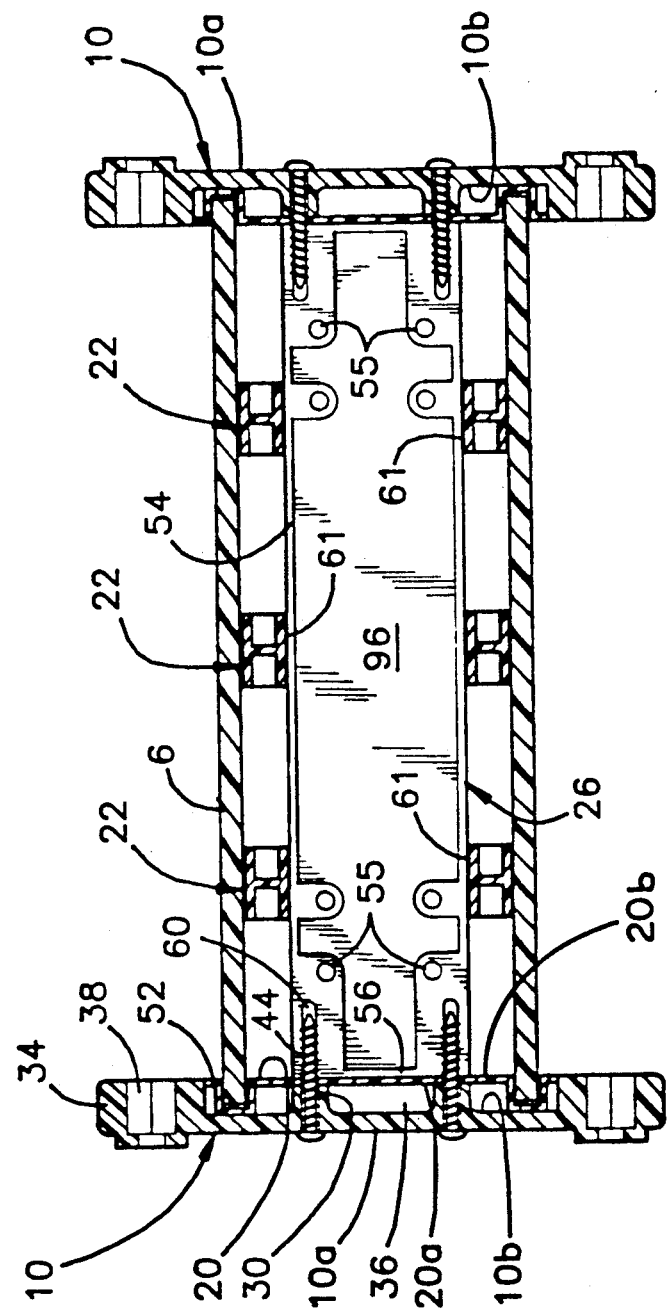
FIG. 4 is a cross-sectional view of the conveyor taken along lines 4—4 of FIG. 2.
Figure 5:
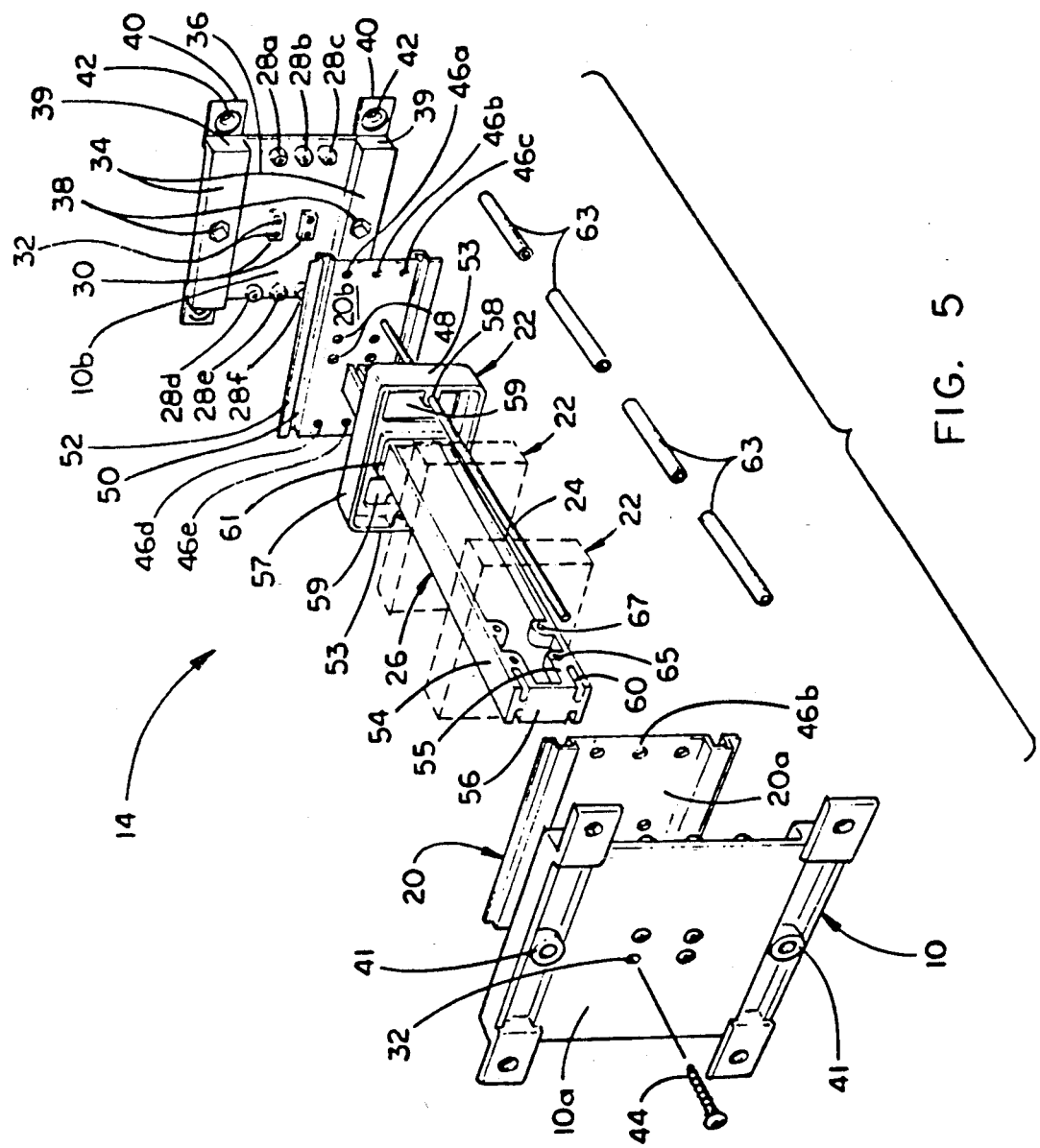
FIG. 5 is an exploded view of a straight connector assembly used in the conveyor according to the invention.

Referring to FIGS. 4 and 5, the straight connector assembly 14 comprises: a pair of opposing straight connector frames 10 having exterior surfaces 10a and interior surfaces 10b, a pair of opposing straight connector belt guides 20 having exterior surfaces 20a and interior surfaces 20b, a transversely extending cross member 26 and two spacer rods 24. Also, the straight connector assembly 14 preferably includes one straight connector belt support 22 for every four to six inches of conveyor width. For example, a conveyor having a width of two inches may not need any belt supports 22. A conveyor having a width of thirty six inches may require four to six or more belt supports 22, depending on the application (i.e., a heavily loaded conveyor would probably require more belt supports).

The interior surface 10b of the straight connector frame 10 includes two longitudinally extending projections 34 disposed at opposite vertical ends of the straight connector frame and a recess 36 formed between the projections 34. Centrally located on each projection 34 is a hexagonally shaped recess 38 having a bolt hole disposed therein. The bolt hole extends through the straight connector frame 10 to the exterior surface 10a of the straight connector frame and is axially aligned with a boss 41 which projects from the exterior surface 10a of the straight connector frame. Two side walls 39 form longitudinal ends of each projection 34. Integrally mounted to the projections 34 and disposed adjacent the exterior surfaces 10a are rectangular tabs 40 which extend longitudinally from the projections 34. Each tab 40 has a circular recess 42 disposed within it. The circular recess 42 is slightly larger than the outside diameter of the boss 41 and has a bolt hole disposed within it.

Each side wall 39 of the projections 34 forms a right angle with its respective longitudinally extending tab 40. The recess 36 formed between the projections 34 includes a pair of longitudinally extending bosses 30, wherein each boss has two screw holes 32 located adjacent its longitudinal ends. All of the screw holes 32 extend through the bosses 30 and through the straight connector frame to the exterior surface 10a of the straight connector frame. The recess 36 also has three circular bosses 28 disposed along a vertical axis near each longitudinal end of the recess 36. Each circular boss 28 has an annular aperture therein which does not extend through the straight connector frame as the screw holes 32 do.

The straight connector belt guide 20 is formed so that its exterior surface 20a can be mounted within the recess 36 of the straight connector frame 10. As best shown in FIG. 4, the exterior surface 20a of the straight connector belt guide 20 bears against the rectangular bosses 30. Each straight connector belt guide 20 includes two channels 50 extending longitudinally along its upper and lower edges through which the conveyor belt moves. Each connector belt guide 20 also includes a channel edge 52 which is located adjacent to the projection 34 of the straight connector frame 10 and has a surface flush with the projection 34.

Each straight connector belt guide has two sets of three vertically oriented holes 46 located at opposing longitudinal ends thereof. Holes 46a, 46c, 46d can receive screws which extend into the apertures of bosses 28a, 28c, 28d to thereby assist in connecting the belt guide 20 to the frame 10. Four screw holes 48 are located in a central portion of the belt guide 20 and extend through the belt guide. When the belt guide is mounted within the recess 36 of the straight connector frame, the screw holes 48 are axially oriented with the four screw holes 32.

A cross member 26 extends transversely of the conveyor and provides support for the conveyor. As best shown in FIGS. 4 and 5, the cross member 26 includes two horizontal beams 54 and two vertical beams 56 which are integrally connected to form the cross member 26. A center beam 96 is integrally formed between the vertical beams and the horizontal beams and provides further support. At each corner of the cross member 26 where the horizontal beam is mounted to the vertical beam is an integrally mounted rib 55. Each rib 55 includes two lateral slots 60 for receiving two self-tapping screws 44. Although holes would be structurally superior to the slots 60, the preferred embodiment utilizes slots because if holes were used, the cost of producing each cross member 26 would be much greater.

The straight connector assembly 14 also includes one straight connector belt support 22 for every four to six inches of conveyor width. Each of these belt supports has two recesses 59 formed at opposing longitudinal ends of the belt supports. A third central recess 61 is provided between the recesses 59. The third central recess 61 slidably receives the cross member 26. Furthermore, each straight connector belt support 22 includes a horizontal belt supporting surface 57 for supporting the weight of the conveyor belt and the materials being transported thereon.

Extending longitudinally inwardly from each side 53 of the straight connector belt support 22 is an arm 58 having an aperture therein. The aperture of each arm 58 slidably receives the spacer rod 24. Each spacer rod 24 includes sleeves 63 which slidably receive the spacer rod. One sleeve 63 is disposed between each adjacent straight connector belt support 22 to prevent transverse movement of the belt support toward or away from the other belt supports. Similarly, a sleeve 63 is positioned between each straight connector belt guide 20 and its respective adjacent straight connector belt support 22 to prevent movement of these respective parts toward or away from each other. The spacer rods 24 are disposed within the holes 46b, 46e of each opposing straight connector belt guide, and are then mounted within the annular apertures of the circular bosses 28b, 28e of each opposing connector frame 10. Because the annular apertures within the circular bosses 28b, 28e do not extend all the way through the connector frame 10, the spacer rods 24 do not extend all the way through the connector frame 10. Thus, the spacer rods 24 are restricted from moving transversely of the conveyor by each opposing connector frame 10.

As best shown in FIG. 4, the eight self-tapping screws 44 can be threadably engaged within the lateral slots 60 of the cross member 26 by turning the screws in a clockwise direction using a conventional screw driver. As each screw 44 rotates within each lateral slot 60, whatever portion of the lateral slot 60 is contacted by the threads of the screw 44 is thereby machined into an internally threaded lateral slot by the screw 44. Thus, the cross member 26 then bears against each opposing straight connector belt guide 20 which in turn bears against the rectangular bosses 30 of the straight connector frames 10.

Figure 6:
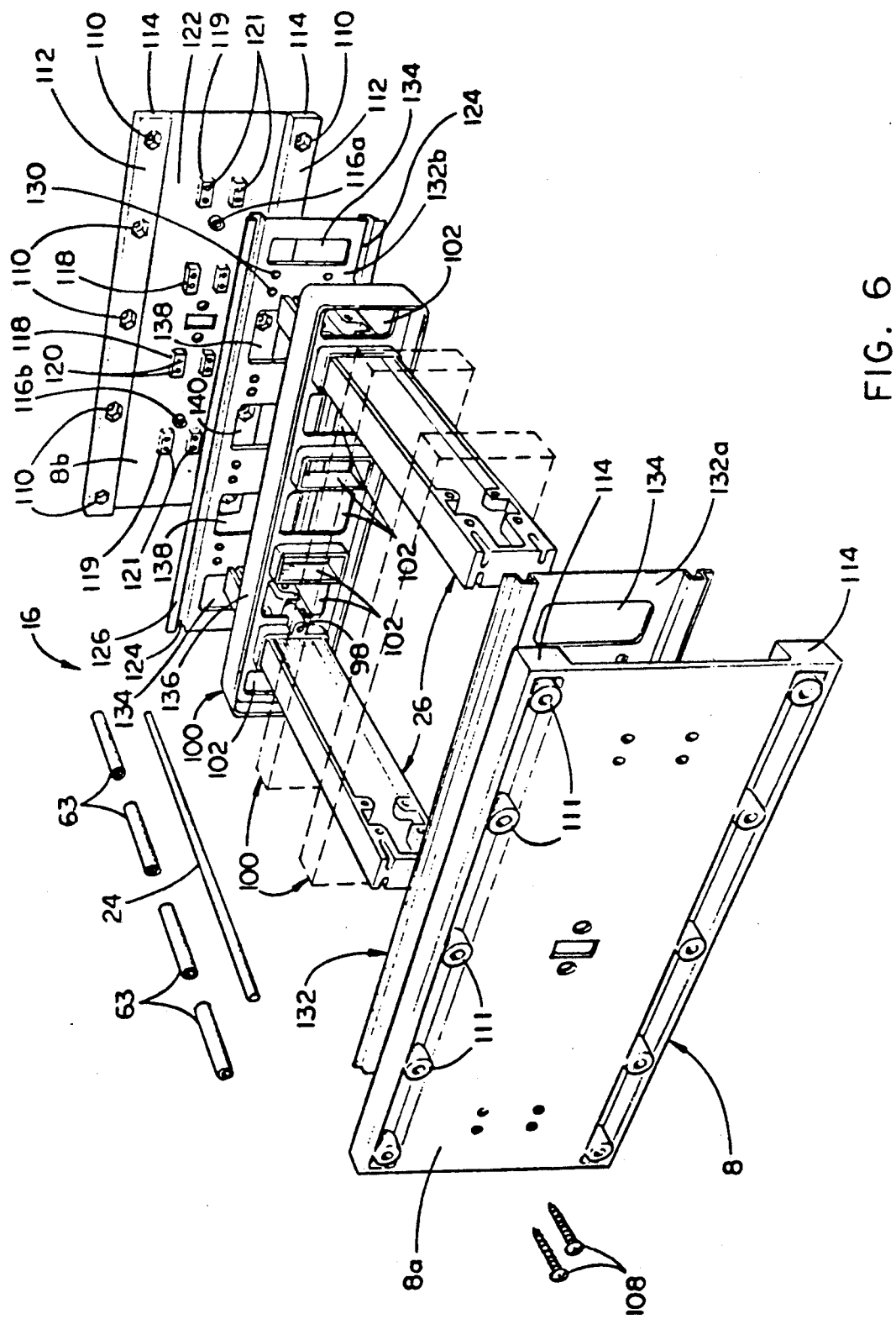
FIG. 6 is an exploded view of a frame assembly used in the conveyor according to the invention.

A frame assembly 16 is shown in FIG. 6, and has a construction similar to that of the straight connector assembly 14. A straight frame 8 has an exterior surface 8a and an interior surface 8b. The interior surface 8b includes two longitudinally extending projections 112 formed at opposing vertical ends of the straight frame and a recess 122 formed between the projections 112. Each projection 112 has five longitudinally spaced, hexagonally shaped recesses 110 having bolt holes disposed therein. These bolt holes extend through the straight frame 8 to the exterior surface 8a of the straight frame and are axially aligned with two rows of five longitudinally spaced bosses 111 which project from the exterior surface 8a of the straight frame 8. The recess 122 has four pairs of longitudinally extending bosses 118, 119 which are rectangular in cross section. Each pair of bosses is positioned such that one boss is vertically disposed above the other boss. Each boss 118, 119 includes two screw holes 120, 121, respectively, disposed at opposing longitudinal ends of the boss. The two pairs of bosses 119 are located nearest the longitudinal ends of the straight frame 8. The two pairs of bosses 118 are located between the two pairs of bosses 119. The screw holes 121 formed in the bosses 119 extend through the interior surface 8b of the straight frame to the exterior surface 8a of the straight frame. The screw holes 120 formed in the bosses 118 do not extend all the way through the straight frame as the screw holes 121 do. Two bosses 116a, 116b project from the recess 122 and are disposed longitudinally inwardly of the bosses 119. Each boss 116a, 116b is circular and has an annular aperture disposed therein. Two side walls 114 form longitudinal ends of each projection 112.

The frame assembly 16 also includes a frame belt guide 132 having an exterior surface 132a and an interior surface 132b. Two longitudinally extending channels 124 are disposed at opposing vertical ends of the frame belt guide 132. Each frame belt guide 132 also includes two longitudinally extending edges 126 disposed at its vertical ends which are located adjacent the channels 124. The frame belt guide 132 also includes four sets of four holes 130. Furthermore, five recesses are provided in the belt guide. Two recesses 134 are positioned near each longitudinal end of the belt guide. Two recesses 138 are positioned longitudinally inwardly from the recesses 134. The fifth recess 140 is provided in the longitudinal center of the belt guide, between the recesses 138.

The frame assembly 16 preferably also includes one frame belt support 100 for every four to six inches of conveyor width. The frame belt supports 100 extend longitudinally within the frame assembly 16. Each frame belt support is provided with nine rectangular recesses 102.

Referring to FIGS. 3 and 6, the frame belt support 100 includes two arms 98 (only one is shown in FIG. 6) having apertures therein, through which the spacer rods 24 may be slidably received. Two cross members 26 having an identical construction as previously described in reference to the straight connector assembly 14 extend transversely through two of the recesses 102. Eight self-tapping screws 108 extend through the screw holes 121 of both straight frames 8, extend through the axially aligned holes 130 of the frame belt guides 132, and engage the lateral slots 60 of each cross member 26. The spacer rods 24 are constructed in the same manner and operate analogously to the spacer rods as described in reference to the straight connector assembly 14. However, the spacer rods extend through the recesses 138 in the frame belt guide instead of extending through holes in the frame belt guide.

The modular aspect of the invention is best illustrated by a description of how a frame assembly is connected to a straight connector assembly. Two side walls 114 of the straight frame 8 can be placed against two side walls 39 of two projections 34 of the straight connector frame 10. Next, the two circular recesses 42 of the straight connector frame 10 can slidably receive two bosses 111 of the straight frame 8. Two bolts 43 (FIG. 2) can then be inserted through the two bolt holes of the circular recesses 42 and through the bolt holes disposed within the hexagonally shaped recesses 110. Two hexagonally shaped nuts (not shown) can then be threadably engaged with the bolts, and thereby secure the straight connector frame 10 to the straight frame 8. The hexagonally shaped nuts fit snugly within the hexagonally shaped recesses 110.

Because the two bosses 111 are slidably received within the circular recesses 42, the conveyor frame can support a much greater vertical load. The relatively large circumference of the boss 111/recess 42 combination provides greater surface contact than would a typically smaller diameter bolt/hole combination, thus providing a stronger connection between the frame assembly and the straight connector assembly. This strength could be achieved in other ways, such as with a vertical tang and slot combination which would have no connection with the bolt/nut/bolt hole combination.

Once the straight frame 8 is connected to the straight connector frame 10, the frame assembly 16 is consequently connected to the straight connector assembly 14. In other words, only the frames need to be connected to connect these two assemblies together. The belt supports 100 of the frame assembly 16 will then abut the belt supports 22 of the straight connector assembly 14. Referring to FIG. 2, each frame belt supporting surface 136 abuts an adjacent straight connector belt supporting surface 57. The conveyor belt 6 bears against these belt supporting surfaces when the conveyor is in operation.

Figure 7:
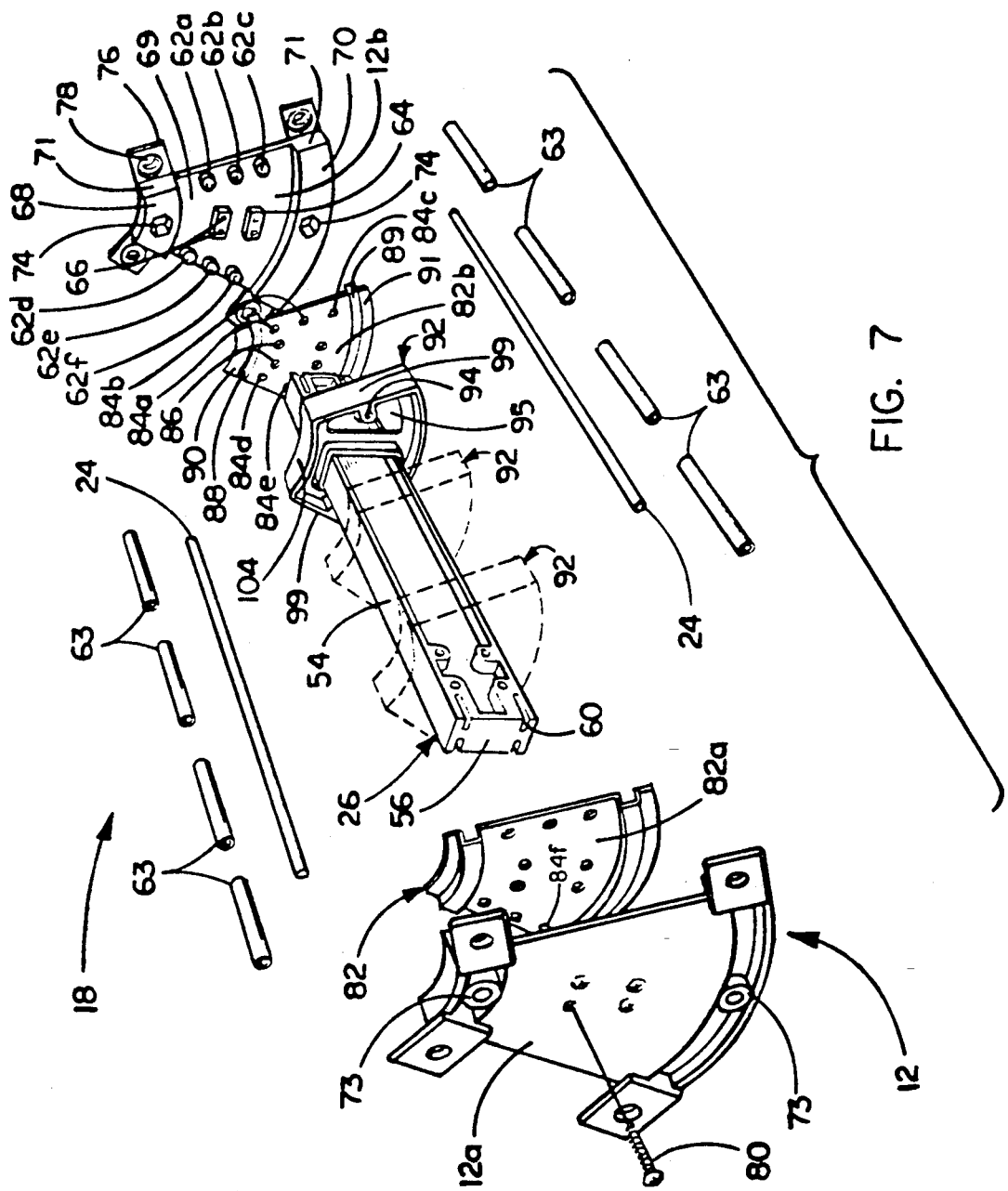
FIG. 7 is an exploded view of an angular connector assembly used in the conveyor according to the invention.

Referring now to FIG. 7, the angular connector assembly 18 is shown. It includes two opposing angular connector frames 12 having exterior surfaces 12a and interior surfaces 12b, two angular connector belt guides 82 having exterior surfaces 82a and interior surfaces 82b, one cross member 26 and two spacer rods 24. Also, the angular connector assembly 18 preferably includes one angular connector belt support 92 for every four to six inches of conveyor width.

The interior surface 12b of each angular connector frame 12 includes two longitudinally extending projections 68, 70 disposed at opposite vertical ends of the angular connector frame and a recess 69 formed between the projections 68, 70. Because each angular connector frame 12, each angular connector belt guide 82, and each angular connector belt support 92 have converging end surfaces, the top end of each piece will have a different longitudinal dimension than the bottom end of each piece. If an upward movement of the conveyor is desired, the angular connector assembly 18 should be oriented as shown in FIG. 7. If a downward movement of the conveyor is desired, the entire angular connector assembly 18 should be rotated 180° and then attached to the preceding assembly of the conveyor.

Integrally mounted to the projections 68, 70 and disposed adjacent to the exterior surfaces 12a are rectangular tabs 76 which extend longitudinally from the projections 68, 70. Each tab 76 has a circular recess 78 having a bolt hole disposed within it. Each side wall 71 of the projections 68, 70 forms a right angle with the longitudinally extending tabs 76. Each projection 68, 70 includes a hexagonally shaped recess 74 located near its longitudinal center. Each hexagonally shaped recess 74 has a bolt hole disposed therein which extends through the angular connector frame 12 to the exterior surface 12a of the angular connector frame 12. Each bolt hole is axially aligned with a boss 73 which projects from the exterior surface 12a of the angular connector frame 12.

The recess 69 formed between the projections 68, 70 includes a pair of longitudinally extending bosses 64, wherein each boss has two screw holes 66 located adjacent its longitudinal ends. All of the screw holes 66 extend through the bosses 64 and through the angular connector frame to the exterior surface 12a of the angular connector frame. The recess 69 also has two sets of three circular bosses 62 disposed along an axis which is parallel to each respective longitudinal end of the recess 69. Each circular boss 62 has an annular aperture therein which does not extend through the angular connector frame as the screw holes 66 do.

The angular connector belt guide 82 is formed so that the exterior surface 82a can be mounted within the recess 69 of the angular connector frame. The exterior surface 82a of the angular connector belt guide 82 bears against the rectangular bosses 64 of the angular connector frame. Each angular connector belt guide includes two channels 88, 89 extending longitudinally along its upper and lower edges through which the conveyor belt moves. Each angular connector belt guide 82 also includes two channel edges 90, 91 which are located adjacent to the projections 68, 70, respectively, and have surfaces flush with the projections 68, 70.

Each angular connector belt guide has two sets of three holes 84 located at opposing longitudinal ends thereof and aligned along an axis generally parallel to each respective longitudinal end of the belt guide 82. Holes 84a, 84c, 84d, 84f receive screws which extend into the apertures of bosses 62a, 62c, 62d, 62f, to thereby assist in connecting the belt guide 82 to the frame 12. Four screw holes 86 are located in a central portion of the belt guide and extend through the belt guide. When the belt guide is mounted within the recess 69 of the angular connector frame, the screw holes 86 are axially oriented with the four screw holes 66. The cross member 26 extends transversely of the conveyor and has a construction as described in the description of the straight connector assembly 14.

Each of the angular connector belt supports 92 has two recesses 95 (only one is shown in FIG. 7) formed at opposing longitudinal ends of the belt supports. A third recess is provided between the recesses 95. The third recess slidably receives the cross member 26.

Each angular connector belt support 92 includes a belt supporting surface 104 for supporting the weight of the conveyor belt and the materials being transported thereon. Extending longitudinally inwardly of the angular connector belt support from each side 99 of the belt support is an arm 94 having an aperture therein. The aperture of each arm 94 slidably receives the spacer rod 24.

Each spacer rod includes sleeves 63 which slidably receive the spacer rods 24. One sleeve 63 is disposed between each adjacent angular connector belt support 92 to prevent transverse movement of the belt support toward or away from the other belt supports. Similarly, a sleeve 63 is positioned between each angular connector belt guide 82 and its respective adjacent angular connector belt support 92 to prevent movement of these respective parts toward or away from each other. The spacer rods 24 are disposed within the holes 84b, 84e of each opposing angular connector belt guide, and are then mounted within the annular apertures of the circular bosses 62b, 62e extending from the opposing connector frames 12. Because the annular apertures within the circular bosses 62b, 62e do not extend all the way through the connector frame 12, the spacer rod 24 does not extend all the way through the angular connector frame 12.

Eight self-tapping screws 80 can be threadably engaged within the lateral slots 60 of the cross member 26 by turning the screws in a clockwise direction using a conventional screw driver. As each screw 80 rotates within each lateral slot 60, whatever portion of the lateral slot 60 is contacted by the threads of the screw 80 is thereby machined into an internally threaded lateral slot by the screw 80. Thus, the cross member 26 then bears against each opposing angular connector belt guide 82 which in turn bears against the rectangular bosses 64 of the angular connector frames 12.

Once again, the modular aspect of the invention can be illustrated by a description of how a frame assembly is connected to an angular connector assembly. Two side walls 114 of the straight frame 8 can be placed against the side walls 71 of the projections 68, 70 of the angular connector frame 12. Next, the two circular recesses 78 of the angular connector frame 12 can slidably receive two bosses 111 of the straight frame 8. Two bolts 43 (FIG. 2) can then be inserted through the two bolt holes of the circular recesses 78 and through the bolt holes disposed within the hexagonally shaped recesses 110. Two hexagonally shaped nuts (not shown) can then be threadably engaged with the bolts 43, and thereby secure the angular connector frame 12 to the straight frame 8. The hexagonally shaped nuts fit snugly within the hexagonally shaped recesses 110.

Because the two bosses 111 are slidably received within the circular recesses 78, the conveyor frame can support a much greater vertical load. The relatively large circumference of the boss 111/recess 78 combination provides greater surface contact than would a typically smaller diameter bolt/hole combination, thus providing a stronger connection between the frame assembly and the angular connector assembly. This strength could be achieved in other ways, such as with a vertical tang and slot combination which would have no connection with the bolt/nut/bolt hole combination.

Once the straight frame 8 is connected to the angular connector frame 12, the frame assembly 16 is consequently connected to the angular connector assembly 18. The belt supports 100 of the frame assembly will then abut the belt supports 92 of the angular connector assembly.

The end section assembly 19 is shown in FIG. 3 and comprises an end frame 9, a first end section belt guide 142, a second end section belt guide 144, an end section belt support 146, two cross members 26, and two spacer rods 24. The cross members 26 and the two spacer rods 24 have constructions as previously described in regard to the straight connector assembly 14. The end frame 9 is constructed the same as the straight frame 8. The first end section belt guide 142 has a semicircular channel 150 formed therein through which the conveyor belt 6 moves. The second end section belt guide 144 is similar to the frame belt guide 132 but has a shorter length. The end section belt support 146 has a construction similar to the frame belt support 100 but is shorter. As shown in FIG. 2, the end section belt supports 146 nave belt supporting surfaces 148 which abut the belt supporting surfaces 57 of the straight connector assembly 14. The cross members 26 provide support for the conveyor in an identical manner as discussed above with regard to the straight connector assembly 14.

Referring to FIG. 1, an optional fence 170 can be mounted to the framing means 4 to provide a retaining wall for items being conveyed. The fence 170 prevents items from falling off the conveyor and onto the floor. The fence 170 comprises a frame fence 172, a straight connector fence 174 and an angular connector fence (not shown). The frame fence 172 can be mounted to the straight frame 8. The straight connector fence 174 can be mounted to the straight connector frame 10. The angular connector fence can be mounted to the angular connector frame 12.

An interior surface of the frame fence 172 has five longitudinally spaced, vertically aligned pairs of hexagonally shaped recesses 176 having bolt holes disposed therein. These bolt holes extend through the frame fence 172 to the exterior surface of the frame fence and are axially aligned with bosses which project from the exterior surface of the frame fence. The straight connector fence 174 and the angular connector fence each have one pair of hexagonally shaped recesses 176. Also, the frame fence 172 has two tabs (not shown) which extend downwardly from the frame fence 172. These tabs are constructed analogously to the tabs 40 of the straight connector assembly 14 (FIG. 5). Also analogous to the tabs 40, each of the tabs of the frame fence has a bolt hole which extends through the tab and a larger diameter recess in its innermost surface. The straight connector fence 174 and the angular connector fence each have one tab which extends downwardly.

Each of these fence assemblies may be mounted to the respective portion of the conveyor frame in a similar manner. For instance, the frame fence 172 may be mounted to the straight frame 8 in the following manner. First, the bottom of the frame fence 172 is placed against the top of the projection 112 of the straight frame 8 so that it bears against the projection 112. Next, two of the upper five bosses 111 of the straight frame 8 are axially aligned with the recesses of the downwardly extending tabs of the frame fence. These two bosses 111 of the straight frame 8 are then disposed within the axially aligned recesses of the tabs of the frame fence. A nut and bolt (not shown) are then used to secure each of these two tabs to the corresponding bosses 111. Thus, the frame fence 172 is connected to the straight frame 8.

Each part of the framing means 4 can be made of synthetic plastic resin or cast from metal such as aluminum. The preferred embodiment of the invention contemplates use of the following materials for each part of the framing means. The straight frame 8, the straight connector frame 10, the angular connector frame 12, the frame fence 172, the straight connector fence 174, and the angular connector fence are all preferably made of polycarbonate reinforced with glass fibers. Also, each cross member 26 is preferably made of polycarbonate reinforced with glass fibers.

Each belt guide 20, 132, 82, 142 and 144 should be made from a wear resistant synthetic plastic resin having a low coefficient of friction such as polybutylene terephthalate. Also, each belt support 22, 100, 92 and 146 should be made of a wear resistant material having a low coefficient of friction such as polybutylene terephthalate. Each spacer rod 24 is preferably made of polyester resin reinforced with fiberglass. Each sleeve 63 is preferably made of an inexpensive material such as polyethylene or rubber.

The above materials are thought to be the best materials available for constructing the conveyor of the present invention. Other materials having certain desired characteristics can also be used. If different materials are used, they should embody the prime characteristics of the recommended materials such as strength, stiffness, resistance to warpage, wear resistance, low coefficient of friction, etc.

Each part of the frame assembly 16 and the straight connector assembly 14 is symmetrical about a central horizontal plane, symmetrical about a central vertical transverse plane, and symmetrical about a central vertical longitudinal plane. Each part of the angular connector assembly 18 is symmetrical about the central vertical transverse plane and the central vertical longitudinal plane.

The conveyor belt 6 is a link type belt having links which are connected together with relatively stiff rods. These rods are constructed the same as the spacer rods 24 and are also preferably made of polyester resin reinforced with fiberglass.

Because the conveyor belt 6 is relatively stiff transversely but flexible longitudinally, the conveyor belt can easily travel around the radii of the ends of the conveyor and the angular connector assemblies 18. In addition, the stiffness of the belt in the transverse direction prevents the belt from coming out of the channels 88 of the angular connector belt guides 82 and prevents sagging of the belt on the bottom (return) of the conveyor due to gravity.

The invention thus comprises a conveyor configuration in which the framing means for supporting the conveyor belt 6 consists of a plurality of synthetic plastic resin modular units interconnected by means of the straight connector assemblies 14 and the angular connector assemblies 18 to create a conveyor system having sections extending at various angles to each other. The principal building block for the modular conveyor is the frame assembly 16. Each of these units is interconnected by the straight connector assembly 14 or the angular connector assembly 18 to construct a conveyor system having any desired number of straight or angular interconnections. The straight connector assemblies 14 and the angular connector assemblies 18 are designed such that they can be used interchangeably without affecting the length of the conveyor belt 6. Thus, each time the angular connector assembly 18 is substituted for the straight connector assembly 14 or vice versa, the length of the conveyor belt need not be adjusted. This aspect of the invention represents a major improvement over the prior art conveyors. Secondly, the modularity of the conveyor provides flexibility in constructing an unlimited number of conveyor systems with ease. Furthermore, each part of the framing means 4 can be made of a lightweight plastic and can be formed in a uniform manner.

It is apparent that several of the hexagonally shaped recesses 38, 74, 110, 176 having bolt holes disposed therein are not utilized as described above. These unutilized bolt holes are provided for the convenience of the end user to use at his or her discretion. The unutilized bolt holes can be used to mount the support members 2, suspend the conveyor from overhead, mount one conveyor on top of another, or to mount auxiliary equipment.

Reasonable variation and modification are possible within the spirit of the foregoing specification and drawings without departing from the scope of the invention which is defined in the accompanying claims.

I claim:

1. In a conveyor having a belt support frame, leg supports for the belt support frame and a continuous belt supported and guided by the belt support frame for continuous movement, the improvement which comprises:

the belt support frame comprising:
a plurality of modular assemblies;
connector assemblies for joining the modular assemblies end to end to form conveyors of different size and shape, the connector assemblies comprising straight section assemblies for extending the conveyor along a linear path and angular section assemblies for extending the conveyor along an angular path with respect to a preceding modular assembly, and the straight section assemblies and the angular section assemblies can be used interchangeably without affecting the length of the continuous belt;
each of said modular assemblies comprising at least one frame member with a belt guide channel to guide an edge of the belt;
at least one cross member attached to the frame member;
belt supports on the cross members, the belt supports having a belt support surface in belt supporting relationship to the belt; and
the modular assemblies and the connector assemblies are joined end to end in alternating relationship.

2. A conveyor according to claim 1 wherein the modular assemblies comprise a frame member on each side of the modular assembly.

3. A conveyor according to claim 2 wherein the modular assemblies further comprise a belt guide connected to the frame member and forming the belt guide channel.

4. A conveyor according to claim 2 wherein the cross member is made from a synthetic plastic material.

5. A conveyor according to claim 3 wherein spacers are provided between the belt supports to position the supports on the cross members.

6. A conveyor according to claim 5 wherein the spacers comprise rods mounted between the frame members; and sleeves mounted on the rods between the belt supports and between the belt supports and the belt guides.

7. A conveyor according to claim 1 wherein the frame members are made from a synthetic plastic resin.

8. A conveyor according to claim 1 wherein each of the frame members and belt supports are symmetrical about a horizontal plane and a vertical transverse plane.

9. A conveyor according to claim 1 wherein the modular assemblies frame members include bosses which are snugly received in recesses in the connector assemblies to connect the frame members together.

10. A conveyor according to claim 1 wherein said modular assemblies and connector assemblies are symmetrical about a vertical transverse plane.

11. A conveyor according to claim 1 wherein the modular assemblies and the straight section assemblies are symmetrical about a horizontal plane.

12. A conveyor according to claim 11 wherein the modular assemblies and the connector assemblies are symmetrical about a vertical longitudinal plane.

13. A conveyor according to claim 12 wherein the connector assemblies are symmetrical about a vertical transverse plane.

14. A conveyor according to claim 13 wherein at least some connector assemblies are symmetrical about three mutually perpendicular axes.

15. A conveyor according to claim 14 wherein the frame members are made from a synthetic plastic resin; the modular assemblies further comprise a frame member on each side of the modular assembly; a belt guide made from a synthetic plastic resin and connected to the frame members, the belt guide forming the belt guide channel; the cross members being made from a synthetic plastic material; and spacers between the belt supports to position the supports on the cross members.

16. A conveyor according to claim 15 wherein the spacers comprise rods mounted between the belt guides; and sleeves mounted on the rods between the belt supports and between the belt supports and belt guides.

17. A conveyor according to claim 1 wherein at least some connector assemblies are symmetrical about three mutually perpendicular axes.

18. A conveyor according to claim 1 wherein said belt supports are slidably mounted on the cross members.

19. In a conveyor having a belt supporting frame, leg supports for supporting the frame and a continuous belt supported and guided by the frame for continuous movement, the improvement which comprises:
    said belt supporting frame comprising:
        a plurality of modular frame assemblies, each of said modular frame assemblies comprising:
            at least one frame member with a belt guide channel to guide an edge of the belt;
            at least one cross member attached to the frame member;
            belt supports on the cross-members, the belt supports having a belt support surface in belt supporting relationship to the belt;
            each of the frame members and belt supports are symmetrical about a horizontal plane and a vertical transverse plane;
        connector assemblies for joining the modular frame assemblies end to end to form conveyors of different size and shape;
        said connector assemblies and frame assemblies being joined end to end in alternating relationship.

20. A conveyor according to claim 19 wherein the connector assemblies comprise straight section assemblies for extending the conveyor along a linear path and angular section assemblies for extending the conveyor along an angular path with respect to a preceding modular frame assembly, wherein the straight section assemblies and the angular section assemblies can be used interchangeably without affecting the length of the belt.

21. A conveyor according to claim 20 wherein said angular section assemblies are symmetrical about a vertical plane so that said angular section assemblies can be used to extend said conveyor along an upward direction or along a downward direction.

22. A conveyor according to claim 21 wherein said straight section assemblies and said modular frame assemblies are symmetrical about three mutually perpendicular planes so that said straight section assemblies and said modular frame assemblies can be used in a variety of different orientations.

23. A conveyor according to claim 20 wherein said straight section assemblies and said modular frame assemblies are symmetrical about three mutually perpendicular planes so that said straight section assemblies and said modular frame assemblies can be used in a variety of different orientations.

24. A conveyor according to claim 19 wherein each of said modular frame assemblies comprises:
    side frame members made from a synthetic plastic resin forming sidewalls of the modular frame assembly;
    cross members made from a synthetic plastic resin connected to the side frame members; and
    belt supports made from a synthetic plastic resin, mounted on the cross members and having a belt support surface for supporting the belt.

25. A conveyor according to claim 24 wherein the modular frame assemblies further comprise a belt guide made of a synthetic plastic material and mounted to an inner surface of the side frame members, the belt guide having an inwardly directed channel to guide the belt.

26. A conveyor according to claim 25 wherein the modular frame assemblies and the connector assemblies are injection molded.

* * * * *